(12) United States Patent
Kovalan et al.

(10) Patent No.: US 9,612,985 B1
(45) Date of Patent: Apr. 4, 2017

(54) SYNCHRONIZATION MECHANISMS FOR HIGH-INTEGRITY COMPUTING

(71) Applicants: Mark A. Kovalan, Cedar Rapids, IA (US); Mark Clifford Singer, Cedar Rapids, IA (US); Douglas L. Bader, Cedar Rapids, IA (US); Douglas Robert Johnson, Cedar Rapids, IA (US); John William Roltgen, III, Cedar Rapids, IA (US)

(72) Inventors: Mark A. Kovalan, Cedar Rapids, IA (US); Mark Clifford Singer, Cedar Rapids, IA (US); Douglas L. Bader, Cedar Rapids, IA (US); Douglas Robert Johnson, Cedar Rapids, IA (US); John William Roltgen, III, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 429 days.

(21) Appl. No.: 14/462,955

(22) Filed: Aug. 19, 2014

(51) Int. Cl.
*G06F 11/00* (2006.01)
*G06F 13/372* (2006.01)

(52) U.S. Cl.
CPC .... *G06F 13/372* (2013.01); *G06F 2213/0064* (2013.01); *G06F 2213/3604* (2013.01)

(58) Field of Classification Search
USPC .......................................... 714/5.11
See application file for complete search history.

(56) References Cited

U.S. PATENT DOCUMENTS

| 7,852,235 | B1 * | 12/2010 | Johnson | ............ | G06F 11/1641 |
| | | | | | 340/506 |
| 8,015,390 | B1 * | 9/2011 | Corcoran | ............ | G06F 11/1641 |
| | | | | | 712/12 |
| 2012/0117419 | A1 * | 5/2012 | Hillman | ................ | G06F 11/073 |
| | | | | | 714/12 |

* cited by examiner

Primary Examiner — Sarai Butler
(74) Attorney, Agent, or Firm — Nolte & Associates PC

(57) ABSTRACT

A system includes a first plurality of processors, a second plurality of processors dissimilar from the first plurality of processors, a first arbitration device coupled to the first plurality of processors, and a second arbitration device coupled to the second plurality of processors. The first arbitration device and the second arbitration device is configured to receive event data, store the received event data, and to output the received event data at substantially a same time. At least one processor of the first plurality of processors and at least one processor of the second plurality of processors are configured to access the event data.

20 Claims, 2 Drawing Sheets

SYNCHRONIZATION MECHANISMS FOR HIGH-INTEGRITY COMPUTING

BACKGROUND

Current high-integrity avionics systems such as fly-by-wire systems typically use computers having multiple lanes of computation. Each lane of computation may be designed to be fault independent of the other lanes of computation, such that faults may be detected and/or mitigated to minimize failure of the overall system. In such systems, a commercial-off-the-shelf (COTS) processor may be used in each lane of computation, where the COTS processor in each lane of computation may be dissimilar from the respective COTS processor(s) in the other lane(s) of computation. Dissimilar processors may be used in fly-by-wire systems to minimize errors in processor output due to processor design.

The data input to the processors may be synchronized such that the processors in the multiple lanes of computation may perform the same computations on the same data inputs and may, therefore, output the same (or substantially the same) values. The outputs from the dissimilar processors of the multiple lanes of computation may be cross-compared to detect failures and/or errors. However, because not all lanes of computation may operate at the same speed, and because the input data may be accessed using relatively slow peripheral buses, synchronizing the access of the processors to the input data on a transaction-wire basis may require relatively faster lanes of computation to wait for relatively slower lanes of computation to be ready to access the data, resulting in decreased processing performance. Further, such systems may accommodate only a single processor in each lane of computation, since using multiple processors in a lane of computation may result in improper data transfer due to the processors accessing input data in different order.

What is needed, then, are systems and methods for synchronizing access of input data by multiple processors at substantially the same time in order to minimize synchronized input waiting times, resulting in an improved performance, and minimize improper data transfer.

SUMMARY

Example embodiments may be directed to a system including a first plurality of processors, a second plurality of processors dissimilar from the first plurality of processors, a first arbitration device coupled to the first plurality of processors, and a second arbitration device coupled to the second plurality of processors. The first arbitration device and the second arbitration device may be configured to receive event data, store the received event data, and to output the received event data at substantially a same time. A processor of the first plurality of processors and a processor of the second plurality of processors may be configured to access the event data.

Example embodiments may also be directed to a system including a first plurality of processors, a second plurality of processors dissimilar from the first plurality of processors, a first arbitration device coupled to the first plurality of processors, and a second arbitration device coupled to the second plurality of processors. The first arbitration device may be configured to synchronize computation data output from at least one processor of the first plurality of processors and the second arbitration device may be configured to synchronize computation data output from at least one processor of the second plurality of processors. The computation data may be synchronized such that the computation data may be output at substantially a same time.

Example embodiments may be directed to a method for synchronizing access of event data in a computing device of a flight control system. The method may include receiving the event data in a first arbitration device, receiving the event data in a second arbitration device at substantially a same time as receiving the event data in the first arbitration device, storing the event data in the first arbitration device and the second arbitration device, outputting the event data at substantially a same time from the first arbitration device and the second arbitration device, accessing the event data output from the first arbitration device by a processor of a first plurality of processors, and accessing the event data output from the second arbitration device by a processor of a second plurality of processors dissimilar from the first plurality of processors. The event data may be accessed at substantially a same time from the first arbitration device and the second arbitration device.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
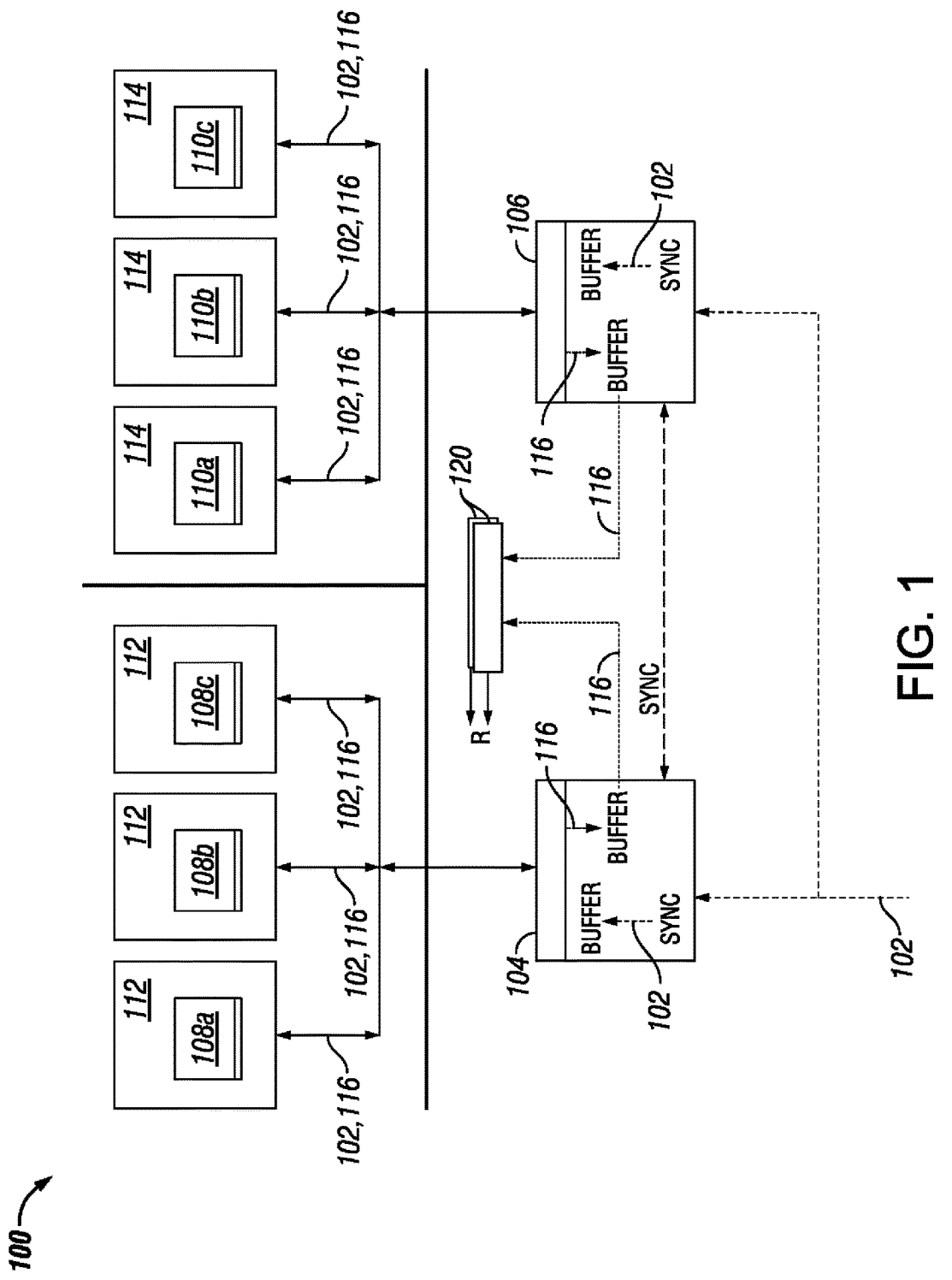
FIG. 1 illustrates a block diagram of a computing device in a fly-by-wire system, according to example embodiments.

It is to be understood that the following disclosure describes several exemplary embodiments for implementing different features, structures, or functions of the present disclosure. Exemplary embodiments of components, arrangements, and configurations are described below to simplify the present disclosure; however, these exemplary embodiments are provided merely as examples and are not intended to limit the scope of the present disclosure. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and the claims to refer to particular components. As one skilled in the art will appreciate, various entities may refer to the same component by different names, and as such, the naming convention for the elements described herein is not intended to limit the scope of the present disclosure, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Example embodiments disclosed may be directed to systems and methods for synchronizing access of input data by multiple dissimilar processors. In fly-by-wire systems, system integrity (e.g., the system is configured to be relatively fail-safe by minimizing incorrect outputs and thereby being fail-operative) and system availability (e.g., if one device fails the aircraft can still be controlled) are of relatively high importance. Therefore, fly-by-wire systems use multiple lanes of computation having multiple dissimilar commercial-off-the-shelf (COTS) processors in each lane of computation. In an alternative, one or more lanes of computation may have a single processor while the remaining lane(s) of computation may have multiple dissimilar COTS processors. The COTS processors may be dissimilar in that the COTS processors may have different clock speeds, different register sizes, different architectures, and the like. For ease of explanation, example embodiments discussed below are directed to systems having two lanes of computation. However, it will be understood that example embodiments discussed below are fully applicable to systems having more than two lanes of computation. Also, example embodiments discussed below are directed to systems having dissimilar processors in each lane of computation; however, it will be understood that systems having similar processors in each lane of computation (or similar processors in one lane and dissimilar processors in another lane) are also within the scope of this disclosure. Further, although example embodiments below are discussed with respect to a fly-by-wire system, it should be noted that the example embodiments are fully applicable to other avionics systems such as pilot display systems.

FIG. 1 illustrates a block diagram of a computing device 100 in a fly-by-wire system, according to example embodiments. The computing device 100 may be a part of the fly-by-wire system that may include multiple computing devices 100, or the computing device 100 may be the fly-by-wire system itself. In FIG. 1, event data 102 from a pilot/co-pilot action (e.g., yoke deflection and rudder pedal deflection), air speed sensor, altitude sensor, and the like, individually or in combination, may be received by the computing device 100. The event data 102 may be provided to two arbitration devices, illustrated in FIG. 1 as first arbitration device 104 and a second arbitration device 106, at substantially the same time. The two arbitration devices 104, 106 may synchronize (SYNC) the received event data 102 with each other such that each arbitration device 104, 106 may have the same event data 102. In an example embodiment, the arbitration devices 104, 106 may verify the received event data 102 using techniques such as cyclic redundancy check (CRC). The arbitration devices 104, 106 may also indicate to each other, during synchronization (SYNC), that both lanes of computation have received valid event data 102. The event data 102 may be then stored (buffered) in each arbitration device 104, 106 for the duration of a computational frame. According to example embodiments, a computational frame may be around 10 milliseconds long and updated event data 102 may be received during each computation frame. At the end of a computation frame, the event data 102 may be made available at the outputs of the respective arbitration device 104, 106 at exactly the same time (e.g., synchronously). It should be noted that the phrase "exactly at the same time" is used to express substantially close in time such that other steps (e.g., steps related to processing the event data 102 and/or any other data) are not taken between the time of the two steps being carried out. Although the lanes of computation are synchronous, the operations in each respective lane of computation may not be precisely coupled. Rather, the same event in each lane of computation may occur somewhere within a small time interval. The design of the computing device 100 may ensure that both events (one in each lane of computation) may occur before the next event may occur thus accomplishing the synchronization of both incoming and outgoing data.

The computing device 100 may also include a plurality of processors coupled to each arbitration device 104, 106. For example, as illustrated in FIG. 1, processors 108a, 108b, and 108c (may be collectively referred to as processors 108a-c in this application) may be coupled (e.g., communicatively) to the first arbitration device 104, and processors 110a, 110b, and 110c (may be collectively referred to as processors 110a-c in this application) may be coupled (e.g., communicatively) to the second arbitration device 106. Each of the processors 108a-c may be dissimilar to each of the processors 110a-c. Also, each of the processors 108a-c may be dissimilar to each other, and each of the processors 110a-c may be dissimilar to each other. The processors 108a-c, 110a-c may be single core or multi-core processors. The processors 108a-c may be coupled to respective individual cards 112 or all processors 108a-c may be coupled to a single card 112. Similarly, the processors 110a-c may be coupled to respective individual cards 114 or all processors 110a-c may be coupled to a single card 114. In another example embodiment, the processors 108a-c and 110a-c may be coupled to a single card. The cards 112, 114 may facilitate relatively easy removal and replacement of the processors 108a-c, 110a-c.

During operation, event data 102 available at the outputs of the arbitration devices 104, 106 may be accessed by one or more of the respective processors 108a-c, 110a-c coupled thereto. In an example embodiment, only one of the processors 108a-c, 110a-c may synchronously access the event data 102 available at the outputs of the respective arbitration devices 104, 106. It should be noted that, although only one of the processors 108a-c, 110a-c within a lane of computation may access (e.g., directly) event data 102, in an example embodiment, event data 102 may also be indirectly made available to the other processors 108a-c, 110a-c via, for example, shared memory resources. In another example embodiment, two or more processors 108a-c, 110a-c in each lane of computation may access the event data 102 available at the outputs of the respective arbitration devices 104, 106. The event data 102 may be accessed in order. For example, consider two processors 108a, 108b and two processors 110a, 110b. In a computational frame, processors 108a and 110a may access the event data 102 available at the outputs of the respective arbitration devices 104, 106. In the next computational frame, processors 108b and 110b may access the event data 102 available at the outputs of the respective arbitration devices 104, 106. The order of access may be controlled via hardware and/or software.

According to example embodiments, during operation, access requests may be issued by two or more processors 108a-c, 110a-c to access the outputs available at the respective arbitration devices 104, 106. The event data 102 access requests from corresponding processors in the two lanes of computation may be in the same order; however, there may be no order dependency for individual processors 108a-c, 110a-c in each lane of computation. For example, consider processors 108a-c and processors 110a-c. Corresponding processors 108a and 110a may process the outputs at the respective arbitration devices 104, 106 together. Likewise, corresponding processors 108b and 110b may process the outputs at the respective arbitration devices 104, 106 together and corresponding processors 108c and 110c may process the outputs at the respective arbitration devices 104, 106 together. However, processor 108a may process the outputs independent of the outputs processed by processors 108b, 108c. Likewise, processor 110a may process the outputs independent of the outputs processed by processors 110b, 110c.

According to example embodiments, a synchronization signal may be provided to the processors 108a-c, 110a-c at the start of each computation frame. As a result of the synchronization signal, the two lanes of computation may begin accessing the most recently synchronized event data at the outputs of the respective arbitration devices 104, 106. This may ensure that the same updated event data may be available in each lane of computation. Two or more of processors 108a-c, 110a-c may then access the outputs at the respective arbitration devices 104, 106 without regard to an order of access. In other words, processors 108a and 110a may process the outputs at the respective arbitration devices 104, 106 independent of each other.

In an example embodiment, the outputs at the respective arbitration devices 104, 106 during each synchronization event (e.g., the issuance of synchronization signal) may be written to memory pages, and the most recent pages of memory including the synchronized outputs may be provided to the respective processors 108a-c, 110a-c. In another example embodiment, a First-In-First-Out (FIFO) mechanism (e.g., FIFO write-out at each synchronization event) may be utilized and the most recent available output at the respective arbitration devices 104, 106 may be made available to the respective processors 108a-c, 110a-c. Example embodiments disclosed may use Direct Memory Access (DMA) hardware to perform the data transfers into high-speed memory device, e.g., Double Data Rate (DDR) memory, such that subsequent data reads by the processors 108a-c, 110a-c may occur with an increased performance.

According to example embodiments, the first arbitration device 104 and the second arbitration device 106 may synchronize the outputs from the processors 108a-c, 110a-c such that computation data 116 may be produced at exactly the same time. It should be noted that, for implementation efficiency, the arbitration devices 104, 106 may be implemented, for example, on the same chip.

During operation, the processors 108a-c, 110a-c may output computation data 116 to the respective arbitration devices 104, 106. In an example embodiment, only one of the processors 108a-c, 110a-c may output the computation data 116 to the respective arbitration devices 104, 106. However, it should be noted that, other processors within a lane of computation may also contribute data, e.g., indirectly, to the computation data 116 through shared memory resources. In another example embodiment, two or more processors 108a-c, 110a-c in each lane of computation may output the computation data 116 to the respective arbitration devices 104, 106. The output computation data 116 may be output in order. For example, consider processors 108a, 108b and two processors 110a, 110b. In a computation frame, processors 108a and 110a may output computation data 116 to the respective arbitration devices 104, 106. In the next computation frame, processors 108b and 110b may output computation data 116 to the respective arbitration devices 104, 106. In an alternative, processors 108a and 110a, and processors 108b and 110b may output the respective computation data 116 to the respective arbitration devices 104, 106 at predetermined times in a single computation frame, instead of two computation frames. The output order may be controlled via hardware and/or software.

According to example embodiments, computation data 116 may be produced from two or more processors 108a-c, 110a-c and provided to the respective arbitration devices 104, 106. The computation data 116 from the corresponding processors in the two lanes of computation may be output in the same order; however, there may be no order dependency for individual processors 108a-c, 110a-c in each lane of computation. For example, consider processors 108a, 108b, 108c and processors 110a, 110b, 110c. Corresponding processors 108a and 110a may output computation data 116 to the respective arbitration devices 104,106 together. Likewise, corresponding processors 108b and 110b may output computation data 116 to the respective arbitration devices 104, 106 together and corresponding processors 108c and 110c may output computation data 116 to the respective arbitration devices 104, 106. However, processor 108a may output computation data 116 independent of the processors 108b, 108c. Likewise, processor 110a may output computation data 116 independent of the processors 110b, 110c.

According to example embodiments, a synchronization signal may be provided to the processors 108a-c, 110a-c at the start of each computation frame. As a result of the synchronization signal, the two lanes of computation may initiate output of computation data 116 to the respective arbitration devices 104, 106. This may ensure that the same computation data 116 may be output in each lane of computation. Two or more of processors 108a-c, 110a-c may then output computation data to the respective arbitration devices 104, 106 without regard to an order of access. In other words, processors 108a and 110a may output computation data 116 to the respective arbitration devices 104, 106 independent of each other at different times.

As mentioned above, one or more processors 108a-c, 110a-c from the two lanes of computation may output computation data 116 to the respective arbitration devices 104, 106 without regard to order. However, rather than waiting until the end of a computation frame, a synchronization mechanism may monitor the availability of corresponding computation data 116 in each lane of computation, and, when available, the computation data 116 may be provided to the respective arbitration devices 104, 106. As a result, the time required to output the computation data 116 may be reduced since the computing device may not wait for the end of the computation frame.

According to example embodiments, the computation data 116 from the two or more lanes of computation may be cross compared using one or more comparators 120 (one shown in FIG. 1) to ensure that the same computation data may be available in the two or more lanes of computation.

The one or more comparators 120 may each output a result R which may indicate whether the computation data 116 across the two or more lanes of computation is the same or different.

Figure 2:
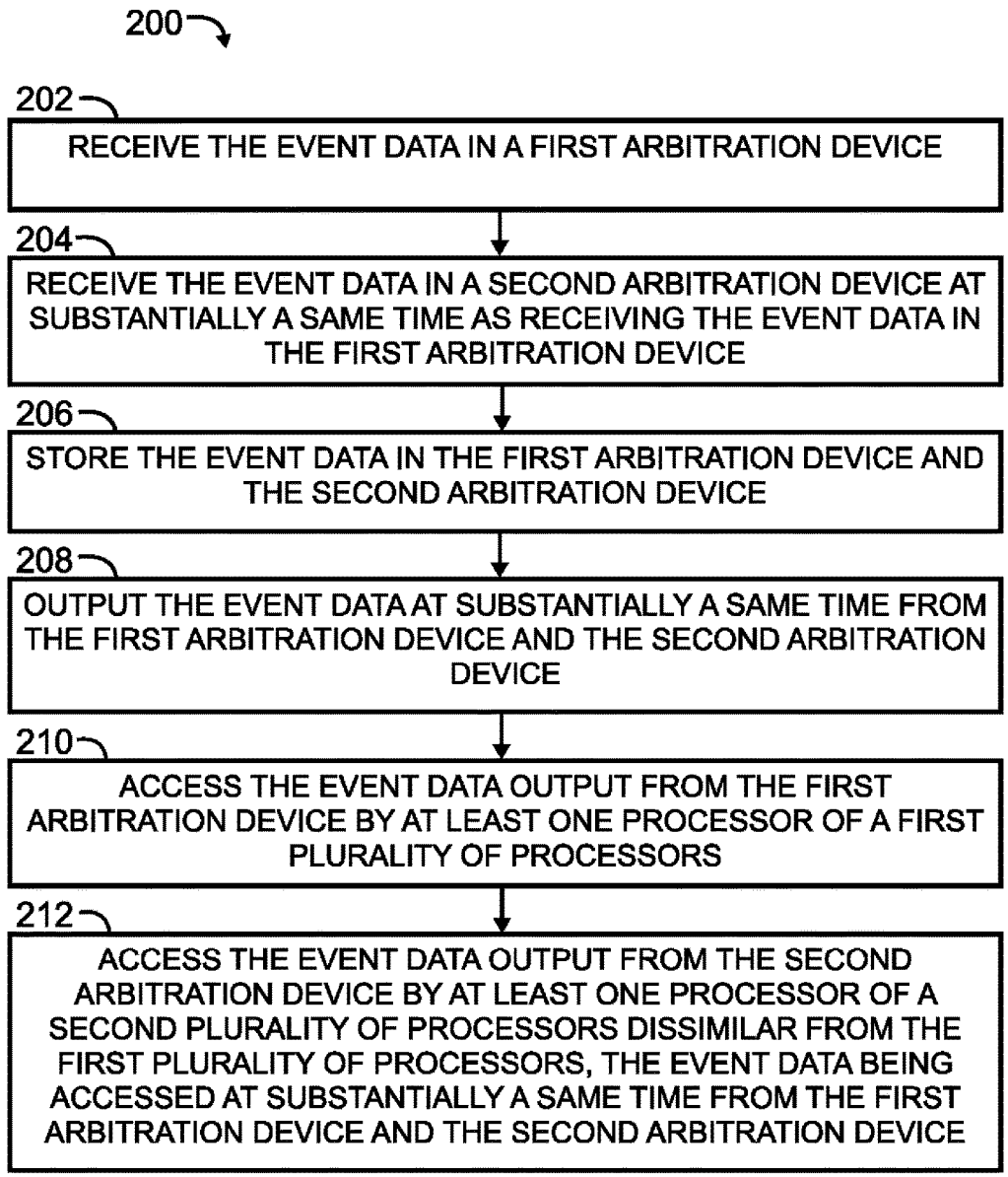
FIG. 2 illustrates a flowchart of a method for synchronizing access of data in a computing device used in a flight control system, according to example embodiments.

FIG. 2 illustrates a flowchart of a method 200 for synchronizing access of data in a computing device used in a flight control system, according to example embodiments. The method 200 may include receiving the event data in a first arbitration device, as at 202, receiving the event data in a second arbitration device at substantially a same time as receiving the event data in the first arbitration device, as at 204, and storing the event data in the first arbitration device and the second arbitration device, as at 206. Further, the method 200 may include outputting the event data at substantially a same time from the first arbitration device and the second arbitration device, as at 208, accessing the event data output from the first arbitration device by at least one processor of a first plurality of processors, as at 210, and accessing the event data output from the second arbitration device by at least one processor of a second plurality of processors dissimilar from the first plurality of processors, as at 212. The event data may be accessed at substantially a same time from the first arbitration device and the second arbitration device.

Example embodiments disclosed above may provide adequate processing throughput to effectively implement applications such as newer generation fly-by-wire systems that may demand high integrity and substantially improved throughput and latency. Also, unlike existing systems, example embodiments may also provide a means for implementing a multi-core processing environment in avionics applications.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A system comprising:
a first plurality of processors;
a second plurality of processors dissimilar from the first plurality of processors;
a first arbitration device coupled to the first plurality of processors; and
a second arbitration device coupled to the second plurality of processors, the first arbitration device and the second arbitration device being configured to receive event data, store the received event data, and to output the received event data at substantially a same time, wherein at least one processor of the first plurality of processors and at least one processor of the second plurality of processors are configured to access the event data.

2. The system of claim 1, wherein the event data output from the first arbitration device is accessed by only one processor of the first plurality of processors.

3. The system of claim 1, wherein the event data output from the second arbitration device is accessed by only one processor of the second plurality of processors.

4. The system of claim 1, wherein at least one processor of the first plurality of processors and at least one processor of the second plurality of processors are configured to access the event data output from the respective first arbitration device and the second arbitration device.

5. The system of claim 4, wherein a processor of the first plurality of processors and a corresponding processor of the second plurality of processors are configured to access the same event data output from the respective first arbitration device and the second arbitration device.

6. The system of claim 1, wherein the first plurality of processors and the second plurality of processors have an equal number of processors.

7. The system of claim 1, wherein the first plurality of processors and the second plurality of processors have a differing number of processors.

8. The system of claim 1, wherein the first arbitration device and the second arbitration device are configured to synchronize the received event data with each other.

9. The system of claim 1, wherein the received event data is stored at substantially the same time in the first arbitration device and the second arbitration device.

10. The system of claim 1, wherein the first plurality of processors and the second plurality of processors are configured to access the event data output from the respective first arbitration device and the second arbitration device in response to a synchronization signal.

11. The system of claim 10, wherein a time at which an event data is accessed by a processor of the first plurality of processors is different than a time at which an event data is accessed by a corresponding processor of the second plurality of processors.

12. A system comprising:
a first plurality of processors;
a second plurality of processors dissimilar from the first plurality of processors;
a first arbitration device coupled to the first plurality of processors; and
a second arbitration device coupled to the second plurality of processors, the first arbitration device configured to synchronize computation data output from at least one processor of the first plurality of processors and the second arbitration device configured to synchronize computation data output from at least one processor of the second plurality of processors, the computation data being synchronized such that the computation data are output at substantially a same time.

13. The system of claim 12, wherein the respective computation data are output by only one processor of the first plurality of processors and only one processor of the second plurality of processors.

14. The system of claim 12, wherein at least one processor of the first plurality of processors and at least one processor of the second plurality of processors are configured to produce computation data.

15. The system of claim 14, wherein corresponding processors of the first plurality of processors and the second plurality of processors are configured to produce the computation data.

16. The system of claim 12, wherein the first plurality of processors and the second plurality of processors are configured to produce outputs in response to a synchronization signal, the outputs being produced independent of each other, and the synchronization signal indicating an end of a time period for computing the outputs.

17. A method for synchronizing access of event data in a computing device of a flight control system, the method comprising:
- receiving event data in a first arbitration device;
- receiving the event data in a second arbitration device at substantially a same time as receiving the event data in the first arbitration device;
- storing the event data in the first arbitration device and the second arbitration device;
- outputting the event data at substantially a same time from the first arbitration device and the second arbitration device;
- accessing the event data output from the first arbitration device by at least one processor of a first plurality of processors; and
- accessing the event data output from the second arbitration device by at least one processor of a second plurality of processors dissimilar from the first plurality of processors, the event data being accessed at substantially a same time from the first arbitration device and the second arbitration device.

18. The method of claim 17, further comprising:
- accessing the event data output from the first arbitration device by only one processor of the first plurality of processors; and
- accessing the event data output from the second arbitration device by only one processor of the second plurality of processors.

19. The method of claim 17, further comprising:
- accessing the event data output from the first arbitration device by at least one processor of the first plurality of processors; and
- accessing the event data output from the second arbitration device by at least one processor of the second plurality of processors.

20. The method of claim 19, wherein a processor of the first plurality of processors and a corresponding processor of the second plurality of processors are configured to access the same event data output at the respective first arbitration device and second arbitration device.

* * * * *